(No Model.)   2 Sheets—Sheet 1.
W. J. TAYLOR.
METALLURGICAL FURNACE.
No. 380,147.   Patented Mar. 27, 1888.
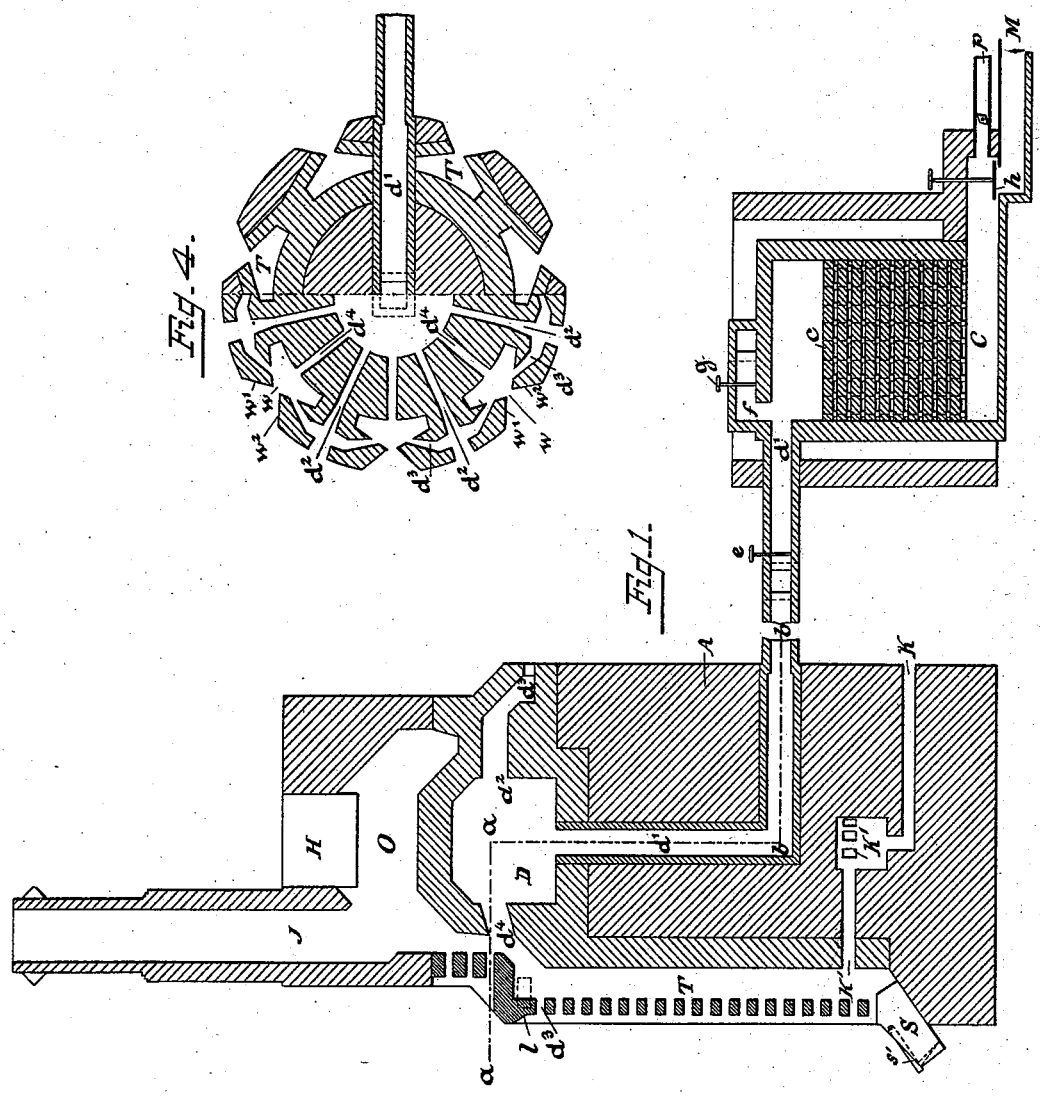
WITNESSES:
INVENTOR:
William J. Taylor

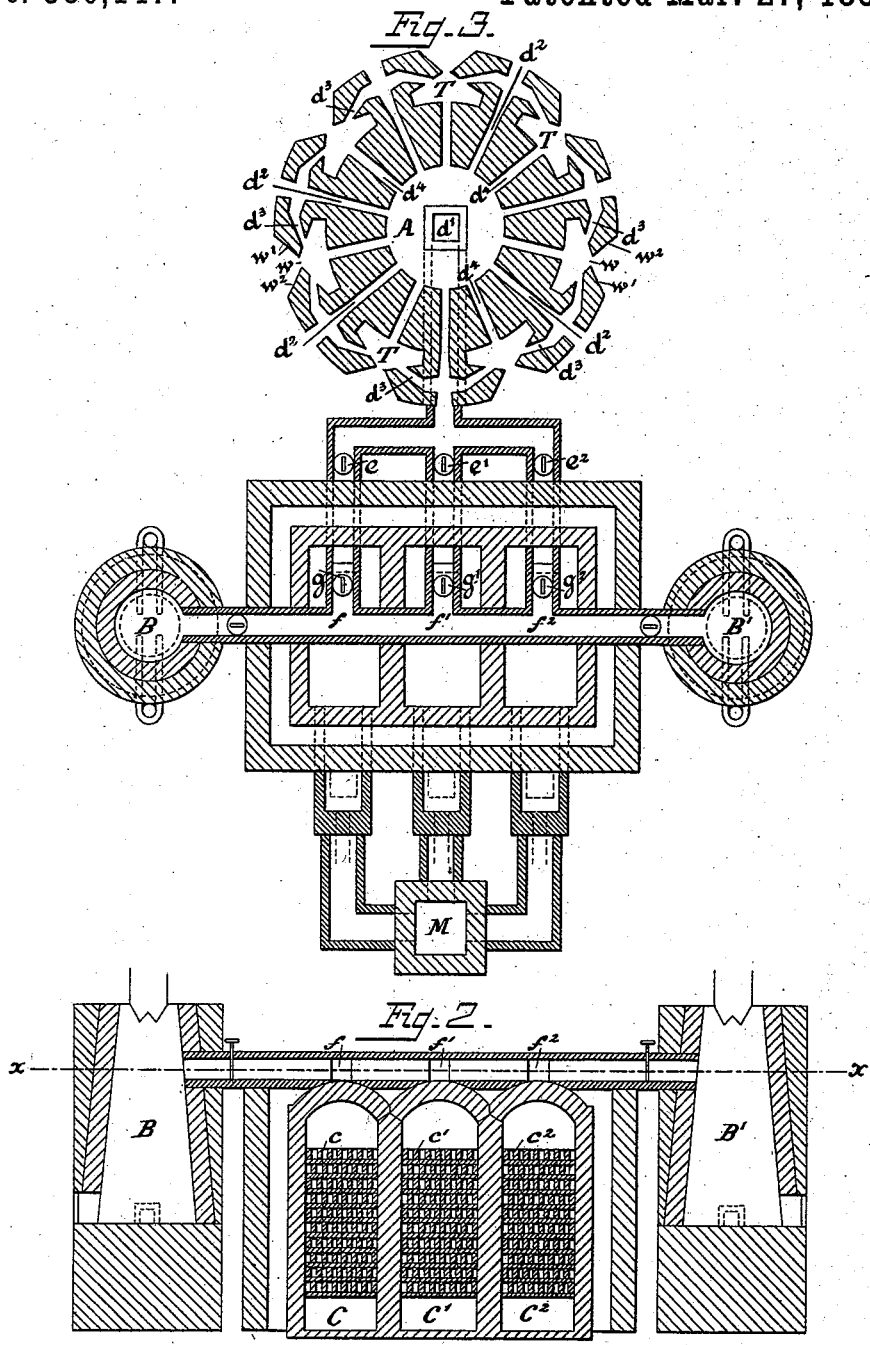

UNITED STATES PATENT OFFICE.

WILLIAM J. TAYLOR, OF CHESTER, NEW JERSEY.

METALLURGICAL FURNACE.

SPECIFICATION forming part of Letters Patent No. 380,147, dated March 27, 1888.

Application filed December 18, 1885. Serial No. 186,053. (No model.)

*To all whom it may concern:*

Be it known that I, WILLIAM J. TAYLOR, of Chester, in the county of Morris and State of New Jersey, have invented certain new and useful Improvements in Apparatus for Treating and Calcining Iron Ores, of which improvements the following is a specification.

My invention relates to certain improvements in a plant or apparatus for the conduct of a process of treating and calcining iron ores containing elements susceptible of being volatilized or oxidized, forming the subject-matter of an application for Letters Patent filed by me under date of August 31, 1885, and through which process absolute control of the temperature within the necessary limits and a more intensely oxidizing atmosphere than has heretofore been possible are obtained by not permitting the products of combustion, which are mainly more reducing than oxidizing, to come into contact with the ore at all during the roasting or calcining operation.

My invention consists of an improved hot-air ore-roasting kiln or furnace, in combination with one or more gas-producers and a series of fire-brick chambers or regenerators filled in with brick checker-work or other similar material, with suitable spaces between the bricks to allow of the absorption by them of the heat of combustion, the construction, arrangement, and operation of which plant or apparatus for the conduct of the aforesaid process of treating and calcining iron or other metallic ores will be hereinafter more particularly described, and pointed out in the claims.

In the accompanying drawings, wherein my invention is fully illustrated, Figure 1 is a longitudinal section through the regenerators, showing in section a kiln. Fig. 2 is a cross-section through a series of regenerators and producers. Fig. 3 is a sectional plan view of the producers and regenerators on the line $x\ x$ of Fig. 2, and also showing a section of a kiln. Fig. 4 is a sectional plan view of a kiln with the ore-chambers, showing the hot-air chamber and the inlet and outlet hot-air flues to the same on the lines $a\ a$ and $b\ b$ of Fig. 1.

Referring, now, to the drawings for a more specific description of the invention, B and B' are the gas-producers for generating the heating-gas from the combustion of the fuel. These gas producers or generators may be made of any suitable form and of a capacity relatively to that of the kiln A and the hot-air chambers or regenerators.

C, C', and $C^2$ are a series of fire-brick chambers or regenerators, preferably three in number, filled in with fire-bricks or checker-work $c$, $c'$, and $c^2$, or their equivalents, and so laid up as to allow of a space between each of them for the passage of the products of combustion to the chimney while being heated. In passing through the chambers the heat generated by the burning gases is absorbed by the brick checker-work $c$, $c'$, and $c^2$, loosely piled up therein.

The gas is conveyed from the producers or generators B and B' to the combustion-chambers of the series of regenerators C, C', and $C^2$ through the conduits or flues $f$, $f'$, and $f^2$, and the air for the combustion of the gases is preferably admitted through the hot-air-discharge flue $d'$ by opening the dampers $e$ and $e'$ or $e'$ and $e^2$ sufficiently to admit hot air enough for the combustion of the gas from the hot air passing to the ore-roasting kiln; and hence it will be observed that by the use of hot air for combustion a very high and uniform or regular temperature is obtained and can be maintained continuously by reversing often.

A is a kiln for roasting the ore, which may be in form cylindrical, with triangular vertical chutes or ore-chambers T arranged near the outer periphery of the same, and having a common ore-receiving chamber, O, in the upper part of the kiln, which is connected at the top with an iron cylinder, H, into which the ore is deposited. The bottom of this iron cylinder H is lower than the top walls of the chamber O. An annular space is thus formed over the ore in the side or top of the receiving or distributing chamber for the reception of the sulphur gases escaping through the hot ore, which annular space is connected with the chimney or uptake J, discharging the sulphur gases into the open air; or these gases may be taken or conveyed from the chimney to a converter and converted into a sulphur of commerce. From the bottom of the ore-receiving chamber O the ore is drawn into the triangular vertical ore chutes or chambers T as fast as the finished product has been drawn out of the chambers below through the iron chutes S after having been sufficiently heated above by the hot air.

In a kiln such as above described the hot air is introduced into the center of the kiln A through the flue $d'$ into the central hot-air receiving and distributing chamber D, and discharged radially through the flue $d^2$ to the front of the ore in the vertical ore-chamber T, and thence discharged circumferentially through the flue $d^3$ under the offset $l$, and directly into the back of the ore through the flue $d^4$ from the central hot-air receiving and distributing chamber D.

One or more direct flues from the central hot-air receiving and distributing chamber to each ore-chamber may be used, if it should be deemed necessary, and a very regular or uniform distribution of the heat obtained and maintained, together with the temperature necessarily required continuously, by such arrangement of apparatus.

The advantages of using the triangular or V-shaped vertical ore-chambers T, as shown in Figs. 1 and 4, extending from the drawing-chutes to the bottom of the receiving and distributing chamber D, are essentially important when combined with the ore-working openings $w$, with their flaring sides $w'$ and $w^2$ diverging from the openings $w$, so as to be nearly in line in the reverse way with the two flaring sides of the ore-chambers T, in order that ready access may be had to the ore by suitable devices, such as bars for working the ore and punching it down through these openings $w$. These openings $w$ are preferably close together and protected from the outside by cast-iron plates properly arranged to take the wear of the working-bars, and so arranged that they may be closed with fire-brick set in at all times when not open for examination and working. The top of the iron chute S, from which the roasted ore is drawn, should be closed by a lid, $s'$, of any construction, and made of such material as may be best adapted for the purpose, so as to prevent the escape of cold air, which may be forced in through a flue or conduit, K, and into the ore by the radial flues or conduits K', entering the ore-chambers T near the bottom thereof, in such quantity as to cause a return of the heat of the ore passing downward through these ore-chambers to the hot zone; or, in other words, by the introduction of cold air near the bottom of the ore-chambers the heat in the ore which would otherwise be largely withdrawn is carried back to the upper part of the chutes supporting the heat of the hot zone, and in this way an active oxidizing atmosphere is obtained and maintained continuously, and practically no heat is extracted from the kiln. The volume or quantity of cold air and the volume and temperature of hot air introduced, as hereinbefore fully explained, can thus be very readily and effectively regulated in practice.

The admission of the gases from the producers or gas-generators B and B' is regulated by the valves $g$, $g'$, and $g^2$. After one or more of the regenerators C, C', and C², with their brick checker-work $c$, $c'$, and $c^2$, have been heated up to the desired temperature, a current of atmospheric air is drawn or driven through the conduit or flue $p$ into the regenerator C, and through the flue $d'$ into the kiln A, minus whatever quantity of air has been demanded in the two remaining regenerators for effecting the combustion of the gases therein, and that are being heated up for utilization. If natural draft should be used, the hot air for combustion, as above described, could not be made available.

By the time that the temperature of the first regenerator, C, has been reduced to a minimum by the giving off of its heat to the air, and thence conveyed to the ore-roasting kiln A, one of the other regenerators will have been heated up for utilization, and by closing the valve $g'$ the gas is shut off from the hot regenerator and the air turned on in a reverse way from a fan or other similar blowing device through the pipe $p$, and the chimney-flue M will have been closed by the damper $h$ and the hot-air damper $e$ opened, the hot air passing through the flue $d'$ into the receiving and distributing chamber D of the kiln, and through the radial flues $d^2$ and $d^4$ and the circumferential flue $d^3$ into the ore to be heated. The cold air is shut off at the pipe $p$ of the cold regenerator C', the chimney-damper $h'$ and the gas-damper $g$ are opened, the hot-air damper $e'$ is partially opened, and the cold regenerator C' heated to a maximum temperature for utilization. The same operation may be repeated or adhered to respecting the other regenerators in the series, and hence it will be observed that a high temperature can be maintained continuously by the respective regenerators, as in the Siemens regenerative furnace, and the brick hot blast for heating air for blast-furnace work.

If it should be deemed necessary in practice at any time to introduce cold air or to supplement the hot air into the combustion-chambers of the series of regenerators for burning the gas, instead of hot air alone, cold-air-admission flues may be introduced into the hot-air flues $d'$, $d^2$, and $d^3$ inside of the valves or dampers $e$, $e'$, and $e^2$, or through the walls of the combustion-chambers of the series of regenerators close to the gas-admission and hot-air flues.

The ore under this process is heated in the kiln A with great uniformity, and no part of it above the temperature of the hot air driven or drawn into the kiln, and as the temperature of the hot air is entirely under the control of the operator within certain limits there is absolute control over the temperature of the ore.

Another feature of my invention is, that there is not at any time burned air in the kiln—that is, air which has yielded its oxygen—for it is quickly removed by the current of fresh air. This is quite important, because air heated to 2,500° Fahrenheit expands over five times from its normal volume at the temperature of the atmosphere, and hence at this temperature there would only be approximately one-fifth of the oxygen present in a given volume of air at a constant pressure, and the importance of quick renewal is apparent; otherwise, if the oxygen were consumed and there was no immediate renewal, it would give as a result an atmosphere composed mainly of nitrogen, rendering it neutral and inoperative.

I am aware that in the Letters Patent No. 309,270, of December 16, 1884, is shown and described a limekiln with openings for the examination of the limestone under treatment and for the admission of bars for poking the same in case of lodgment, and with a slide in the bottom of the kiln for discharging the lime, after it has been sufficiently burned, into the lime-pit, the heat from the lime in the pit being utilized for supporting combustion by passing the air through a conduit into a circular flue, and thence through the hot lime and a conduit and the controlling valves and flues into the regenerators, when it serves for combustion; hence I disclaim such construction of a kiln, and because of its impracticability for properly utilizing and oxidizing the impurities in iron ores, and, furthermore, because it is essential that an oxidizing atmosphere should be obtained and maintained continuously during the entire time the ores are being treated; and it will be manifestly obvious to those skilled in the art that under the construction of a kiln as hereinbefore described, and as shown in the drawings, the ends sought to be obtained are most satisfactorily accomplished.

I am also aware that kilns have been constructed with triangular ore-chambers therein, and therefore do not wish to be understood as claiming, broadly, such construction of kilns for the conduct of my hot-air process of treating and calcining iron or other metallic ores; but,

Having thus described the nature and objects of my invention, what I claim as new, and desire to secure by Letters Patent, is—

1. The combination, with a hot-air ore-roasting kiln having an ore-receiving chamber in the upper part of the kiln, an ore-cylinder extending downward into said chamber, a central hot-air receiving and distributing chamber and a conduit or flue communicating therewith, and ore-chambers arranged around the outer periphery of the kiln, with their working openings and flues, of one or more producers and regenerators and a flue communicating with radial discharging-conduits in said kiln for admitting and discharging successively and continuously currents of cold air into said ore-chambers, for the purposes set forth.

2. The combination, in a hot-air ore roasting and calcining kiln, of ore-chambers having working-openings, a central receiving and distributing chamber and conduit communicating therewith, an offset, $l$, in the kiln for discharging the hot air circumferentially into the ore in the space formed by said offset and the slope of the ore, a flue communicating with radial conduits, whereby currents of cold air are admitted and discharged continuously into the ore-chambers, with one or more gas producers and regenerators, substantially as and for the purposes set forth.

In witness whereof I have hereunto set my hand in the presence of two witnesses.

WILLIAM J. TAYLOR.

Witnesses:
 WALTER S. GIBSON,
 J. WALTER DOUGLASS.